US012692673B2

(12) United States Patent
Glanzer et al.

(10) Patent No.: US 12,692,673 B2
(45) Date of Patent: Jul. 28, 2026

(54) PLATE COMPACTOR

(71) Applicant: MILWAUKEE ELECTRIC TOOL CORPORATION, Brookfield, WI (US)

(72) Inventors: Evan M. Glanzer, Milwaukee, WI (US); John E. Koller, Brookfield, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 941 days.

(21) Appl. No.: 17/369,528

(22) Filed: Jul. 7, 2021

(65) Prior Publication Data

US 2022/0010506 A1 Jan. 13, 2022

Related U.S. Application Data

(60) Provisional application No. 63/137,877, filed on Jan. 15, 2021, provisional application No. 63/118,186, filed on Nov. 25, 2020, provisional application No. 63/059,254, filed on Jul. 31, 2020, provisional application No. 63/048,722, filed on Jul. 7, 2020.

(51) Int. Cl.
| | |
|---|---|
| *E01C 19/40* | (2006.01) |
| *E02D 3/074* | (2006.01) |
| *H02K 7/06* | (2006.01) |
| *H02K 7/10* | (2006.01) |
| *H02K 7/116* | (2006.01) |
| *H02K 11/00* | (2016.01) |

(52) U.S. Cl.
CPC ............ *E01C 19/402* (2013.01); *E02D 3/074* (2013.01); *H02K 7/061* (2013.01); *H02K*

*7/1004* (2013.01); *H02K 7/116* (2013.01); *H02K 11/0094* (2013.01)

(58) Field of Classification Search
CPC ....... E01C 19/402; E02D 3/074; H02K 7/061; H02K 7/1004; H02K 7/116; H02K 11/0094
USPC .................................. 404/113, 133.05–133.2
See application file for complete search history.

(56) References Cited

U.S. PATENT DOCUMENTS

| | | | |
|---|---|---|---|
| 3,306,174 A | 2/1967 | Wardell |
| 3,530,577 A | 9/1970 | Franklin et al. |
| 3,543,655 A | 12/1970 | Uebel |

(Continued)

FOREIGN PATENT DOCUMENTS

| | | |
|---|---|---|
| CN | 2267271 Y | 11/1997 |
| CN | 2837369 Y | 11/2006 |

(Continued)

OTHER PUBLICATIONS

International Search Report and Written Opinion for Application No. PCT/US2022/049189 dated Mar. 22, 2023 (13 pages).

(Continued)

*Primary Examiner* — Raymond W Addie
(74) *Attorney, Agent, or Firm* — Michael Best & Friedrich LLP

(57) ABSTRACT

A compactor includes a plate, a shaft rotatably supported upon the plate, an electric motor configured to cause rotation of the shaft, and an eccentric mass arranged to rotate on the shaft, causing the plate to vibrate in response to rotation of the eccentric mass. The eccentric mass is configured to translate along the shaft.

10 Claims, 11 Drawing Sheets

(56)  References Cited

U.S. PATENT DOCUMENTS

| | | | |
|---|---|---|---|
| 3,759,624 A * | 9/1973 | Hundey | E02D 3/046 |
| | | | 404/133.1 |
| 3,783,701 A | 1/1974 | Steprath et al. | |
| 3,802,791 A | 4/1974 | Uebel et al. | |
| 3,832,080 A * | 8/1974 | Stoecker | B06B 1/166 |
| | | | 74/61 |
| 3,883,260 A | 5/1975 | Heckner | |
| 3,917,426 A | 11/1975 | Wohlwend et al. | |
| 3,972,637 A * | 8/1976 | Sutherland | E02D 3/074 |
| | | | 404/113 |
| 4,043,738 A | 8/1977 | Modesto et al. | |
| 4,113,403 A | 9/1978 | Tertinek et al. | |
| 4,145,156 A | 3/1979 | Grane | |
| 4,199,271 A * | 4/1980 | Riedl | F16M 1/00 |
| | | | 474/146 |
| 4,310,261 A | 1/1982 | Opderbeck | |
| 4,356,736 A | 11/1982 | Riedl | |
| 4,595,384 A * | 6/1986 | Tertinek | E02D 3/074 |
| | | | 474/112 |
| 4,775,263 A | 10/1988 | Persson | |
| 4,838,730 A | 6/1989 | Owens | |
| 5,439,314 A | 8/1995 | Wadensten | |
| 5,462,388 A * | 10/1995 | Polacek | H02K 1/185 |
| | | | 404/116 |
| 5,632,569 A | 5/1997 | Szmansky | |
| 5,672,027 A | 9/1997 | Wadensten | |
| 5,890,834 A | 4/1999 | Waldenberger | |
| 5,957,622 A * | 9/1999 | Vera-Montiel | E01C 19/38 |
| | | | 404/133.1 |
| 6,213,673 B1 | 4/2001 | Jungwirth et al. | |
| 6,213,681 B1 | 4/2001 | Sick et al. | |
| 6,374,569 B1 | 4/2002 | Suckow | |
| 6,379,082 B1 * | 4/2002 | Takemoto | E01C 19/38 |
| | | | 404/113 |
| 6,394,697 B1 | 5/2002 | De Boer | |
| 6,435,767 B1 | 8/2002 | Steffen | |
| 6,551,022 B1 * | 4/2003 | Stayner | E02D 3/074 |
| | | | 404/133.05 |
| 6,558,073 B1 | 5/2003 | Wrazidlo | |
| 6,582,155 B1 | 6/2003 | Bromberger et al. | |
| 6,659,685 B1 | 12/2003 | Persson | |
| 6,717,379 B1 * | 4/2004 | Andersson | B06B 1/166 |
| | | | 404/117 |
| 6,722,815 B2 | 4/2004 | Fervers | |
| 6,794,632 B1 | 9/2004 | Steffen | |
| 6,808,336 B2 | 10/2004 | Fervers et al. | |
| 6,837,648 B1 * | 1/2005 | Wadensten | E01C 19/283 |
| | | | 404/117 |
| 6,846,128 B2 | 1/2005 | Sick | |
| 6,923,595 B1 * | 8/2005 | Chek | E01C 19/402 |
| | | | 15/235.4 |
| 6,953,304 B2 | 10/2005 | Quenzi et al. | |
| 7,052,204 B2 | 5/2006 | Lutz | |
| 7,097,384 B2 | 8/2006 | Lindley | |
| 7,165,469 B2 | 1/2007 | Niemi et al. | |
| 7,175,365 B1 | 2/2007 | Breeding | |
| 7,303,356 B2 | 12/2007 | Schennach et al. | |
| 7,427,176 B2 | 9/2008 | Persson et al. | |
| 7,465,121 B1 | 12/2008 | Hendricks et al. | |
| 7,491,014 B2 | 2/2009 | Sick | |
| 7,686,538 B2 | 3/2010 | Lutz et al. | |
| 7,753,621 B2 | 7/2010 | Steffen | |
| 7,988,383 B2 | 8/2011 | Hickmann | |
| 8,047,742 B2 | 11/2011 | Sick et al. | |
| 8,123,432 B1 | 2/2012 | Steffen | |
| 8,182,173 B2 | 5/2012 | Lickel | |
| 8,277,144 B1 * | 10/2012 | Bayley | E04F 21/244 |
| | | | 15/235.4 |
| 8,414,220 B1 * | 4/2013 | Koba | E01C 19/285 |
| | | | 404/117 |
| 8,429,785 B1 * | 4/2013 | Royal | E01C 19/44 |
| | | | 15/235.8 |
| 8,439,600 B2 | 5/2013 | Brening | |
| 8,602,680 B2 | 12/2013 | Fischer et al. | |

| | | | |
|---|---|---|---|
| 8,608,402 B2 | 12/2013 | Argento et al. | |
| 8,721,218 B2 | 5/2014 | Stenzel | |
| 9,010,452 B2 | 4/2015 | Williamson et al. | |
| 9,062,420 B2 | 6/2015 | Scharer et al. | |
| 9,139,966 B1 | 9/2015 | Mikowychok | |
| 9,175,447 B2 | 11/2015 | Steffen | |
| 9,284,697 B2 | 3/2016 | Steffen | |
| 9,334,613 B2 | 5/2016 | Erdmann et al. | |
| 9,695,605 B2 | 7/2017 | Jin | |
| 9,879,389 B1 | 1/2018 | Lura | |
| 9,925,563 B2 | 3/2018 | Bartl et al. | |
| 10,344,439 B2 * | 7/2019 | Steffen | E01C 19/38 |
| 2006/0053924 A1 | 3/2006 | Antweiler et al. | |
| 2006/0067796 A1 | 3/2006 | Riedl | |
| 2006/0127190 A1 | 6/2006 | Kremer | |
| 2006/0272130 A1 | 12/2006 | Togami et al. | |
| 2008/0298893 A1 | 12/2008 | Stenzel et al. | |
| 2010/0139424 A1 | 6/2010 | Wagner | |
| 2010/0166499 A1 | 7/2010 | Stenzel et al. | |
| 2010/0278590 A1 | 11/2010 | Stenzel | |
| 2012/0251241 A1 | 10/2012 | Sperfslage | |
| 2013/0004237 A1 * | 1/2013 | Krings | E01C 19/288 |
| | | | 404/133.05 |
| 2014/0079484 A1 | 3/2014 | Ries et al. | |
| 2014/0262400 A1 | 9/2014 | Berger | |
| 2015/0063907 A1 | 3/2015 | Graham et al. | |
| 2015/0159384 A1 | 6/2015 | Wetherell | |
| 2015/0362414 A1 | 12/2015 | Stoeckel et al. | |
| 2015/0376845 A1 | 12/2015 | Bartl | |
| 2017/0022673 A1 * | 1/2017 | McKee | E01C 19/38 |
| 2017/0275831 A1 | 9/2017 | Sorg et al. | |

FOREIGN PATENT DOCUMENTS

| | | |
|---|---|---|
| CN | 201092652 Y | 7/2008 |
| CN | 100430554 C | 11/2008 |
| CN | 101671993 A | 3/2010 |
| CN | 101671996 A | 3/2010 |
| CN | 202164588 U | 3/2012 |
| CN | 202247634 U | 5/2012 |
| CN | 202500128 U | 10/2012 |
| CN | 202519568 U | 11/2012 |
| CN | 202519569 U | 11/2012 |
| CN | 203603137 U | 5/2014 |
| CN | 203834321 U | 9/2014 |
| CN | 203834322 U | 9/2014 |
| CN | 203834323 U | 9/2014 |
| CN | 104674635 A | 6/2015 |
| CN | 204626211 U | 9/2015 |
| CN | 204703042 U | 10/2015 |
| CN | 204728309 U | 10/2015 |
| CN | 204898642 U | 12/2015 |
| CN | 205636716 U | 10/2016 |
| CN | 205711983 U | 11/2016 |
| CN | 106192977 A | 12/2016 |
| CN | 205839549 U | 12/2016 |
| CN | 106868990 A | 6/2017 |
| CN | 206298804 U | 7/2017 |
| CN | 206428562 U | 8/2017 |
| CN | 206428563 U | 8/2017 |
| CN | 107165030 A | 9/2017 |
| CN | 206570656 U | 10/2017 |
| CN | 107354933 A | 11/2017 |
| CN | 206843911 U | 1/2018 |
| CN | 207073052 U | 3/2018 |
| CN | 207244834 U | 4/2018 |
| CN | 207392011 U | 5/2018 |
| CN | 207392183 U | 5/2018 |
| CN | 207469046 U | 6/2018 |
| CN | 207484244 U | 6/2018 |
| CN | 207512557 U | 6/2018 |
| CN | 207608902 U | 7/2018 |
| DE | 1911878 A1 | 12/1970 |
| DE | 1634679 B1 | 1/1971 |
| DE | 1964318 A1 | 7/1971 |
| DE | 2155687 A1 | 5/1973 |
| DE | 2319947 A1 | 10/1974 |
| DE | 2336631 A1 | 2/1975 |
| DE | 7316290 U | 7/1976 |

(56) References Cited

FOREIGN PATENT DOCUMENTS

| | | | |
|---|---|---|---|
| DE | 3230747 | A1 | 2/1984 |
| DE | 8223313 | U1 | 3/1984 |
| DE | 3040123 | C2 | 4/1984 |
| DE | 3240626 | C2 | 1/1985 |
| DE | 8513149 | U1 | 1/1988 |
| DE | 9013243 | U1 | 2/1991 |
| DE | 4016822 | A1 | 11/1991 |
| DE | 9213315 | U1 | 12/1992 |
| DE | 9418184 | U1 | 1/1995 |
| DE | 29605664 | U1 | 7/1996 |
| DE | 29521186 | U1 | 11/1996 |
| DE | 29804047 | U1 | 6/1998 |
| DE | 29920177 | U1 | 1/2000 |
| DE | 19840453 | C2 | 9/2000 |
| DE | 19912813 | C1 | 12/2000 |
| DE | 202004015141 | U1 | 12/2004 |
| DE | 102007006209 | A1 | 11/2007 |
| DE | 202009000264 | U1 | 3/2009 |
| DE | 202009004301 | U1 | 11/2009 |
| DE | 202009004302 | U1 | 11/2009 |
| DE | 102010029111 | A1 * | 11/2010 ............. E01C 19/38 |
| DE | 102010019053 | A1 | 11/2011 |
| DE | 202007019293 | U1 | 11/2011 |
| DE | 202010017338 | U8 | 1/2013 |
| DE | 102007003927 | B4 | 12/2013 |
| DE | 102008017058 | B4 | 3/2017 |
| DE | 102016009029 | A1 | 2/2018 |
| DE | 102018010156 | * | 7/2020 ............. E01C 19/26 |
| EP | 0200949 | A2 | 11/1986 |
| EP | 0464939 | A1 | 1/1992 |
| EP | 0655532 | B1 | 7/2000 |
| EP | 1712681 | A1 | 10/2006 |
| EP | 1267001 | B1 | 9/2009 |
| EP | 2458089 | A2 | 5/2012 |
| EP | 1096072 | B1 | 8/2012 |
| EP | 2357283 | B1 | 6/2013 |
| EP | 1980671 | B1 | 11/2015 |
| EP | 2940213 | A1 | 11/2015 |
| EP | 2947205 | A1 | 11/2015 |
| EP | 3069798 | A1 | 9/2016 |
| EP | 3085832 | A1 | 10/2016 |
| EP | 2957486 | B1 | 1/2018 |
| GB | 2455627 | A | 6/2009 |
| JP | 2013181324 | A | 9/2013 |
| JP | 2019065458 | A | 4/2019 |
| KR | 100786886 | B1 | 12/2007 |
| WO | WO1985002220 | A1 | 5/1985 |
| WO | WO1999041461 | A1 | 8/1999 |
| WO | WO2002070824 | A1 | 9/2002 |
| WO | WO2008049542 | A1 | 5/2008 |
| WO | WO2009121606 | A1 | 10/2009 |
| WO | WO2010086669 | A1 | 8/2010 |
| WO | WO2011157344 | A1 | 12/2011 |
| WO | WO2012062384 | A2 | 5/2012 |
| WO | WO2013137015 | A1 | 9/2013 |
| WO | 2014159437 | A1 | 10/2014 |
| WO | 2016089353 | A1 | 6/2016 |
| WO | WO2018019408 | A1 | 2/2018 |
| WO | WO2018068091 | A1 | 4/2018 |
| WO | 2020077829 | A1 | 4/2020 |

OTHER PUBLICATIONS

International Search Report and Written Opinion for Application No. PCT/US2021/040679 dated Oct. 21, 2021 (16 pages).
Extended European Search Report for Application No. 21837741.4 dated Dec. 12, 2024 (11 pages).

* cited by examiner

190

242

214

194

PLATE COMPACTOR

CROSS-REFERENCE TO RELATED APPLICATIONS

This application claims priority to U.S. Provisional Patent Application No. 63/137,877 filed on Jan. 15, 2021, U.S. Provisional Patent Application No. 63/118,186 filed on Nov. 25, 2020, U.S. Provisional Patent Application No. 63/059,254 filed on Jul. 31, 2020, and U.S. Provisional Patent Application No. 63/048,722 filed on Jul. 7, 2020, the entire contents of all of which are incorporated herein by reference.

FIELD OF THE INVENTION

The present invention relates to plate compactors.

BACKGROUND OF THE INVENTION

Plate compactors include a plate that is caused to vibrate in order to compact soil or other loose material.

SUMMARY OF THE INVENTION

The present invention provides, in one aspect, a compactor comprising a plate, a shaft rotatably supported on the plate, an electric motor configured to cause rotation of the shaft, and an eccentric mass arranged to rotate on the shaft, causing the plate to vibrate in response to rotation of the eccentric mass. In response to the shaft rotating in a first rotational direction, the compactor is moved in a first linear direction. In response to the shaft rotating in a second rotational direction that is opposite the first rotational direction, the compactor is moved in a second linear direction that is opposite the first linear direction.

The present invention provides, in another aspect, a compactor comprising a frame, a plate coupled to the frame, a shaft rotatably supported upon the plate, an eccentric mass arranged to rotate on the shaft and configured to vibrate the plate relative to the frame in response to rotation of the eccentric mass, and further configured to effect movement of the plate compactor in a first linear direction and in a second linear direction opposite the first linear direction, an elongated handle moveably coupled to the frame and defining a longitudinal handle axis, the elongated handle having a grip portion and being movable between a first position at which the grip portion follows behind the plate when the compactor moves in the first linear direction, and a second position at which the grip portion follows behind the plate when the compactor moves in the second linear direction, a user interface coupled to the elongated handle and configured to control movement of the compactor between a resting state in which the compactor does not move, a first movement state in which the compactor moves in the first linear direction, and a second movement state in which the compactor moves in the second linear direction, the user interface including a lever defining a longitudinal lever axis and being pivotable about a pivot axis perpendicular to the longitudinal handle axis. In an off position of the lever, the plate compactor is in a resting state and the longitudinal lever axis is parallel to the longitudinal handle axis.

The present invention provides, in yet another aspect, a compactor comprising a plate, a shaft rotatably supported upon the plate, an electric motor configured to rotate the shaft, an eccentric mass arranged to rotate on the shaft and configured to vibrate the plate in response to rotation of the eccentric mass, and further configured to effect movement of the compactor in a first linear direction and in a second linear direction opposite the first linear direction, and a user interface including a first microswitch configured to control an activation state of the electric motor, a second microswitch configured to control a rotation direction of the shaft, and a lever configured to actuate the first microswitch and the second microswitch.

The present invention provides, in yet another aspect, a compactor comprising a plate, a shaft rotatably supported upon the plate, an electric motor configured to cause rotation of the shaft, and an eccentric mass arranged to rotate on the shaft, causing the plate to vibrate in response to rotation of the eccentric mass. The eccentric mass is configured to translate along the shaft.

The present invention provides, in yet another aspect, a compactor comprising a plate, a shaft rotatably supported upon the plate, an electric motor configured to cause rotation of the shaft, a first shaft end selectively coupled to the shaft for rotation therewith, a second shaft end selectively coupled to the shaft for rotation therewith on a side opposite the first shaft end, a first eccentric mass arranged on the first shaft end, a second eccentric mass arranged on the second shaft end, a first clutch configured to selectively couple the first shaft end for rotation with the shaft, and a second clutch configured to selectively couple the second shaft end for rotation with the shaft.

The present invention provides, in yet another aspect, a compactor comprising a plate, a first eccentric mass on a first side of the plate, a second eccentric mass on a second side of the plate, a first electric motor configured to rotate the first eccentric mass, causing the plate to vibrate, and a second electric motor configured to rotate the second eccentric mass, causing the plate to vibrate.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
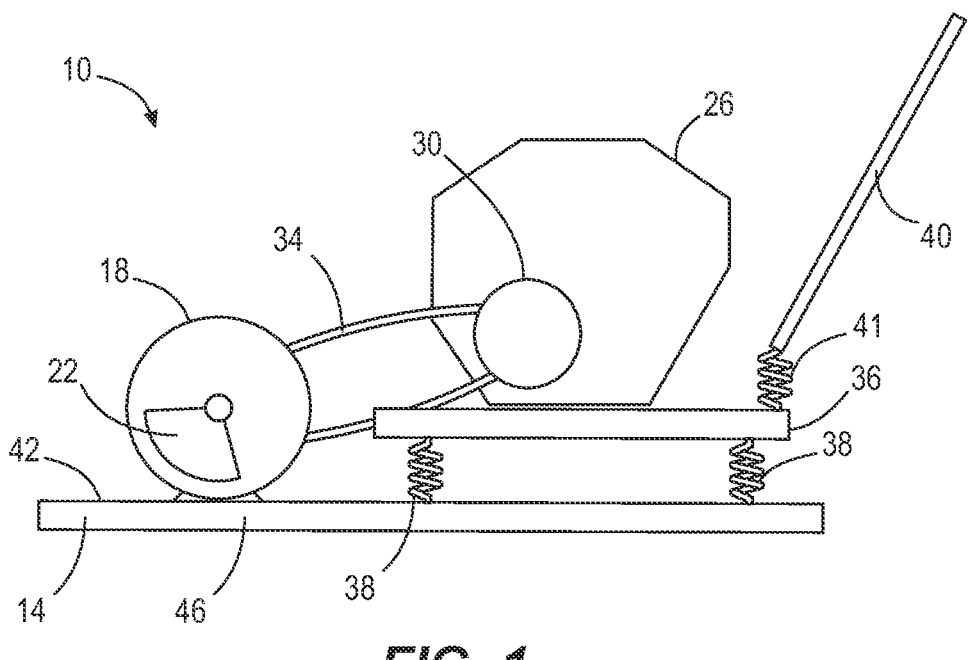
FIG. 1 is a schematic side view of a plate compactor.
Figure 2:
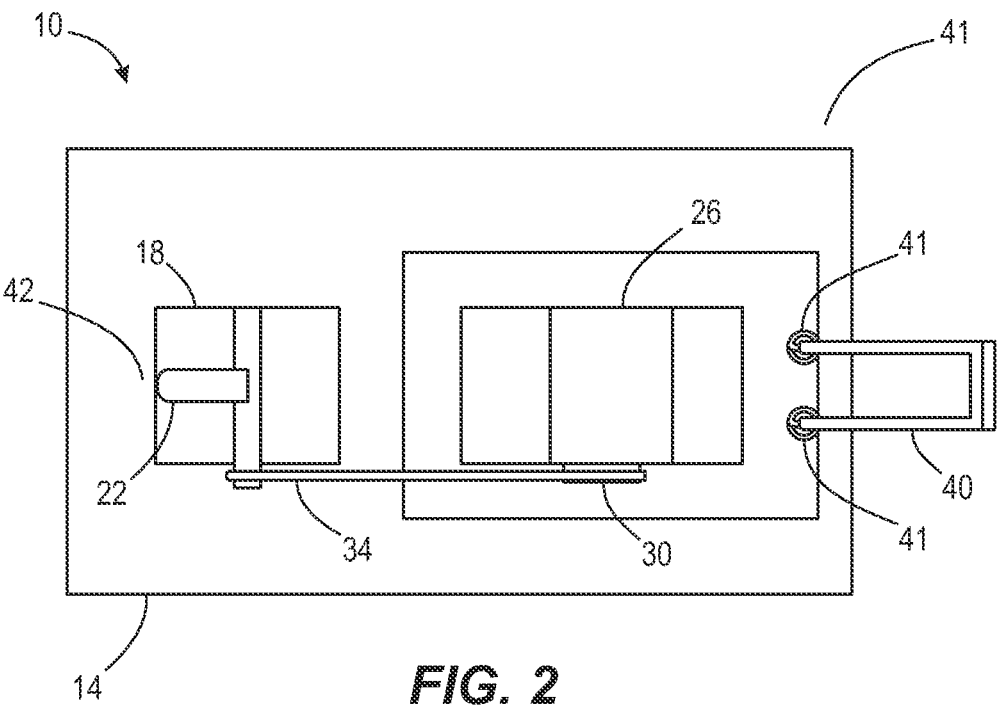
FIG. 2 is a schematic top view of the plate compactor of FIG. 1.

As shown in FIGS. 1 and 2, a typical gas-powered single-direction plate compactor 10 includes a plate 14, an exciter 18 with an eccentric mass 22 to vibrate the plate 14, and a gas engine 26 to drive the exciter 18 via an output pulley 30 and a belt 34. The gas engine 26 is mounted on a platform 36 that is vibrationally isolated from the exciter 18, via vibration isolators 38 or dampers, to protect the gas engine 26 from excessive vibration. A handle 40 is coupled to the platform 36 via another vibration isolator 41 or damper.

With reference to FIG. 2, the eccentric mass 22 is positioned at a front 42 of the plate 14 in order to provide compaction force and drive the compactor 10 in a forward travel direction. The compactor 10 does not include wheels and an entire bottom 46 of the plate maintains contact with the ground during operation. Because the exciter 18 and eccentric mass 22 are laterally centered on the plate 14, the compactor 10 is only capable of moving under its own power in a straight line during operation. To turn the compactor 10, an operator must drag the plate 14 around in a circle while the exciter 18 is still trying to pull the plate 14 forward. Thus, the single-direction plate compactor 10 is heavy and difficult to maneuver.

Figure 3:
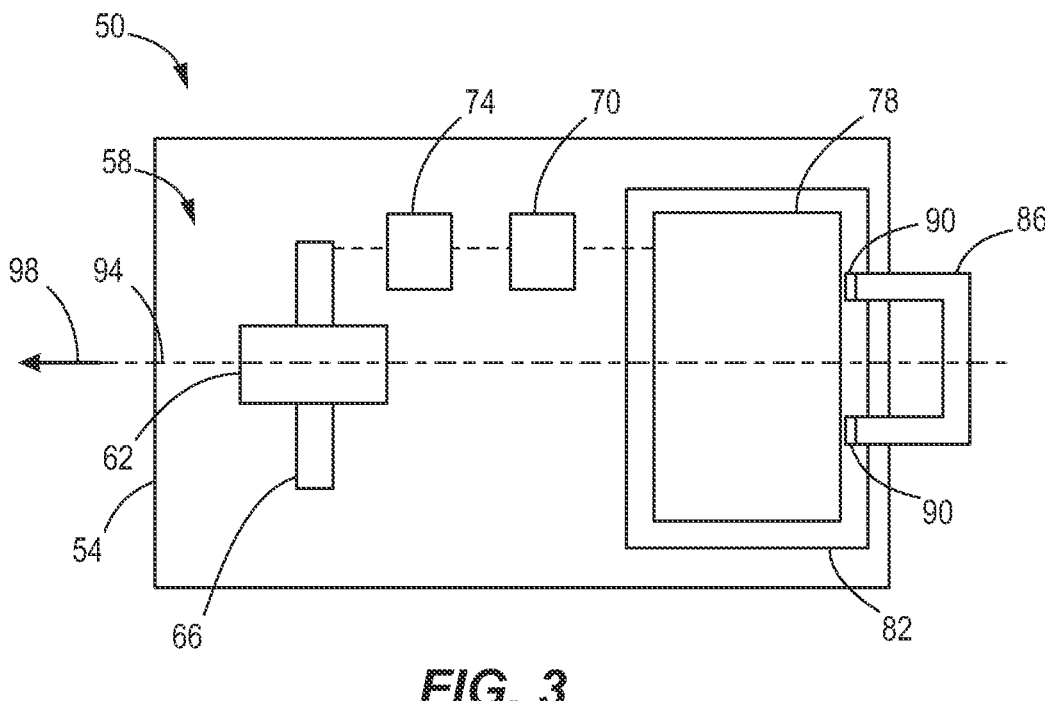
FIG. 3 is a schematic top view of a plate compactor, according to an embodiment of the invention, with an eccentric mass in a center position.
Figure 4:
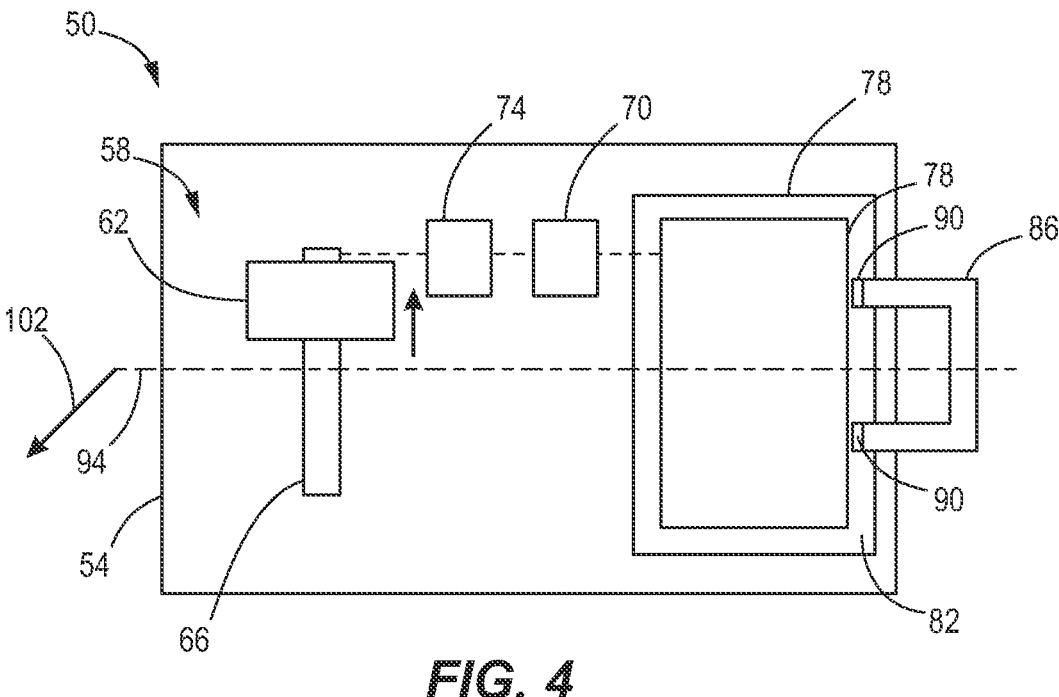
FIG. 4 is a schematic top view of the plate compactor of FIG. 3, with the eccentric mass in a right-side position.
Figures 5, 6, 7, 8:
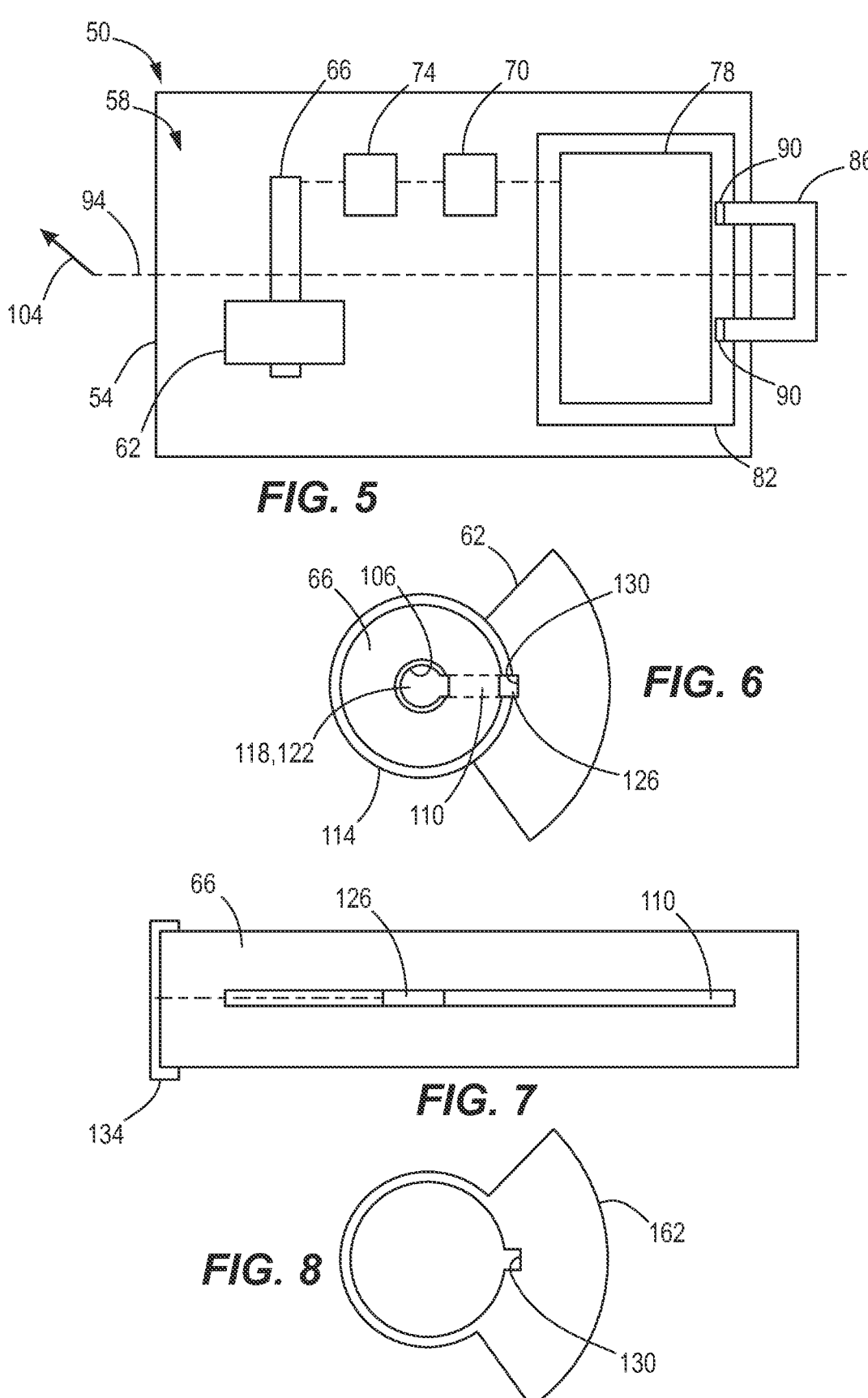
FIG. 5 is a schematic top view of the plate compactor of FIG. 3, with the eccentric mass in a left-side position.
FIG. 6 is a cross-sectional view of a rotating shaft and eccentric mass of the plate compactor of FIG. 3, according to one embodiment of the invention.
FIG. 7 is a cross-sectional view of the rotating shaft of FIG. 6.
FIG. 8 is a cross-sectional view of the eccentric mass of FIG. 6.

FIGS. 3-5 illustrate an embodiment of a plate compactor 50 including a plate 54, an exciter 58 with an eccentric mass 62 rotatable on an exciter shaft 66 to vibrate the plate 54, and an electric motor 70 to drive the exciter 58. In some embodiments, the electric motor 70 drives the exciter 58 directly or, as shown in the embodiment of FIG. 3-5, via an intermediate drive means 74, such as a belt, chain, or gearbox that rotates an end of the exciter shaft 66. A battery (e.g., a battery pack 78) powers the electric motor 70. The battery pack 78 is mounted on a platform 82 that is vibrationally isolated from the electric motor 70. Likewise, a handle 86 is coupled to and vibrationally isolated from the platform 82 via additional vibrational isolators 90 or dampers.

As shown in FIG. 3, the eccentric mass 62 is coupled to the exciter shaft 66 in a way that allows the eccentric mass 62 to translate along the exciter shaft 66 while it is rotating with the exciter shaft 66. When the eccentric mass 62 rotates with the exciter shaft 66 while the eccentric mass 62 is aligned with a central plane 94 that bisects the plate 54, the eccentric mass 62 causes the plate compactor 50 to move in a straight line forward travel direction, as indicated by an arrow 98 shown in FIG. 3. When the rotating eccentric mass 62 is moved to the right of the central plane 94 while rotating with the exciter shaft 66, the plate compactor 50 will move forward and to the left, as indicated by an arrow 102 shown in FIG. 4. When the rotating eccentric mass 62 is moved to the left of the central plane 94 while rotating with the exciter shaft 66, the plate compactor 50 will move forward and to the right, as indicated by an arrow 106 shown in FIG. 5.

FIGS. 6 and 7 illustrate one embodiment in which the eccentric mass 62 of the plate compactor 50 of FIGS. 3-5 can translate along the exciter shaft 66. Specifically, in the embodiment of FIGS. 6 and 7, the exciter shaft 66 includes a longitudinal bore 106 and includes a slot 110 extending from the bore 106 and through an exterior surface 114 of the exciter shaft 66. A sliding key 118 includes a base 122 arranged in the bore 106 and a tab 126 that extends radially outward through the slot 110 to engage with a recess 130 or keyway in the eccentric mass 62, as shown in FIG. 8. A cable or linkage 134 is arranged on one end of the exciter shaft 66 to allow an operator to control the lateral position of the sliding key 118 and the eccentric mass 62 on the exciter shaft 66, thus permitting the operator to turn the plate compactor 50 as shown in FIGS. 4 and 5, as desired.

Figure 9:
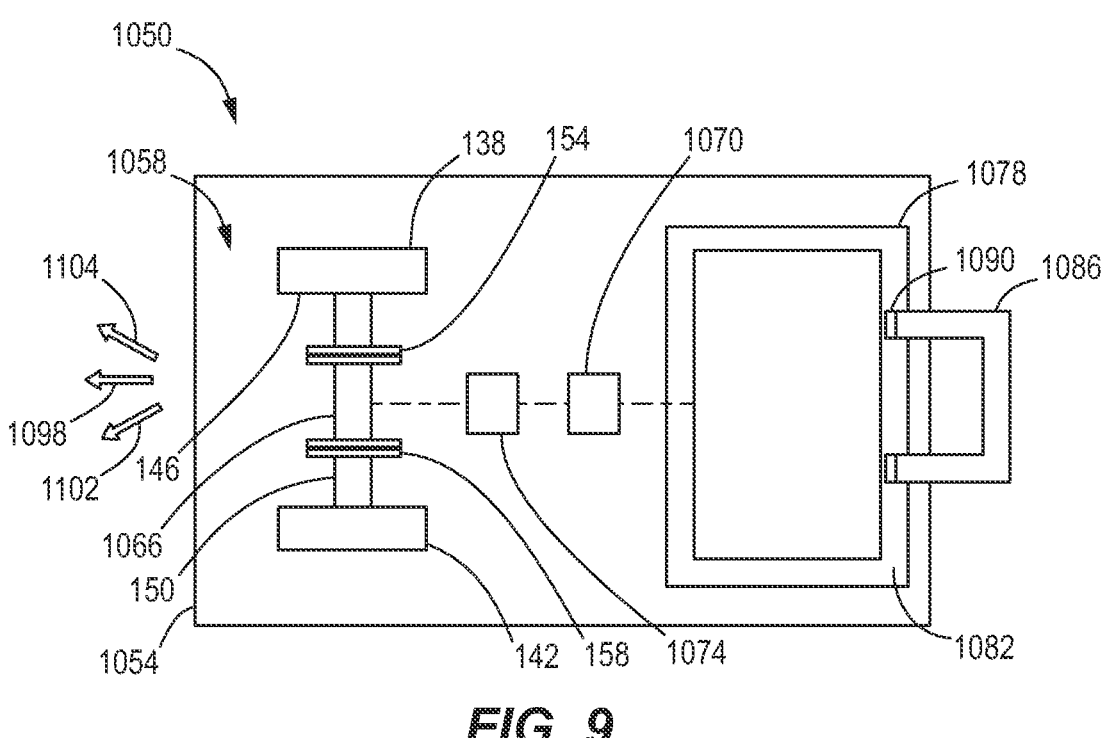
FIG. 9 is a schematic top view of a plate compactor according to another embodiment of the invention.

FIG. 9 illustrates another embodiment of a plate compactor 1050 that is identical to the embodiment of FIGS. 3-5, with like features as the plate compactor 50 shown with like reference numerals plus "1000." Instead of a single translatable eccentric mass 62, in the embodiment of FIG. 9, first and second eccentric masses 138, 142 are respectively coupled for rotation with first and second shaft ends 146, 150 that are arranged on opposite ends of the exciter shaft 1066 and are selectively coupled for rotation with the exciter shaft 1066. Specifically, first and second clutches 154, 158 that can be controlled mechanically or electronically by the operator are respectively arranged between the exciter shaft 1066 and the first and second shaft ends 146, 150.

The first and second clutches 154, 158 allow for one of the first and second shaft ends 146, 150, and thus one of the eccentric masses 138, 142 to rotate with the exciter shaft 1066, while the other of the first and second shaft ends 146, 150, and thus the other of the first and second eccentric masses 138, 142, remains stationary and does not rotate with the exciter shaft 1066. If both the first and second clutches 154, 158 are engaged at the same time, both the first and second shaft ends 146, 150, and both of the eccentric masses 138, 142 will rotate with the exciter shaft 1066 and the compactor 1050 will move in a straight line forward travel direction, as indicated by arrow 1098. If only the first clutch 154 is engaged, only the first shaft end 146, and thus only the first eccentric mass 138 will rotate with the exciter shaft 1066 and the compactor 1050 will move forward and also turn in a direction that is opposite the first shaft end 146, as indicated by arrow 1102. If only the second clutch 158 is engaged, only the second shaft end 150, and thus only the second eccentric mass 142 will rotate with the exciter shaft 1066 and the plate compactor 1050 will move forward and also turn in a direction that is opposite the second shaft end 150, as indicated by arrow 1104. The embodiment of FIG. 9 also allows for the first and second eccentric masses 138, 142 to rotate in phase or out of phase with each other, which permits the compactor 50 perform "spot compaction", i.e., compact while the plate compactor 1050 stays in one place.

In contrast to the embodiment of FIG. 9, reversible plate compactors include two eccentric masses that are not located on the same axis or the same exciter shaft. In reversible plate compactors, one of the eccentric masses is located toward the front of the plate and one is toward the rear of the plate. The eccentric masses of the reversible plate compactor spin in opposite directions and the phase between them can be altered to change the direction of the net force they generate. This allows the reversible plate compactor to move forward, backward, or stay in one place, but does not allow for any turning, as in the embodiment of FIG. 9.

Figure 10:
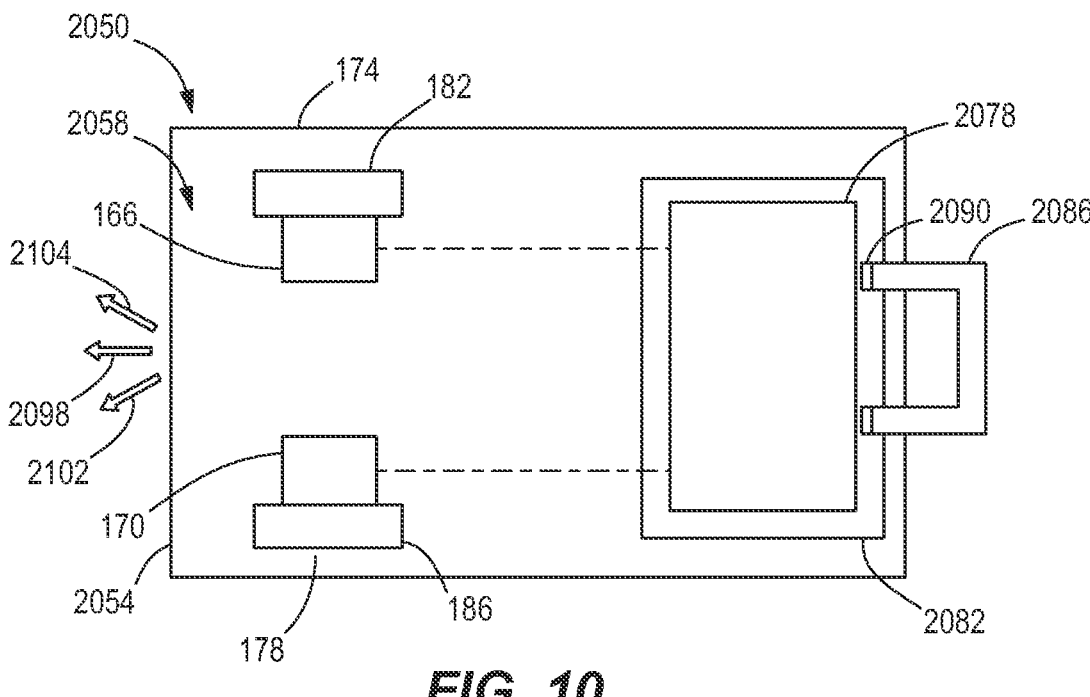
FIG. 10 is a schematic top view of a plate compactor according to another embodiment of the invention.

FIG. 10 illustrates another embodiment of a plate compactor 2050 that is identical to the embodiment of FIGS. 3-5, with like features as the plate compactor 50 shown with like reference numerals plus "2000." In the embodiment of FIG. 10, two independent first and second motors 166, 170 are arranged on first and second sides 174, 178 of the plate 2054 and respectively drive separate first and second eccentric masses 182, 186. If both the first and second motors 166, 170 are activated, both the first and second eccentric masses 182, 186 will rotate and the compactor 2050 will move in a straight line, as indicated by arrow 2098.

If only the first motor 166 is activated, only the first eccentric mass 182 will rotate and the compactor 2050 will move forward and turn in a direction that is opposite the first side 174 of the plate 54, as indicated by arrow 2102. If only the second motor 170 is activated, only the second eccentric mass 186 will rotate and the plate compactor 2050 will move forward and turn in a direction that is opposite the second side 178 of the plate 2054, as indicated by arrow 2104. In the embodiment of FIG. 10, the first and second eccentric masses 182, 186 could be rotated out of phase with each other to perform "spot compaction", i.e., compact while the compactor 2050 stays in one place. The first and second eccentric masses 182, 186 could also be rotated in different directions, allowing the plate compactor 2050 to turn in one place without moving forward, thus providing an increased level of maneuverability.

By using the exciters 58, 1058, 2058 to assist with turning the plate compactors 50, 1050, 2050, in addition to imparting vibration to the plates 54, 1054, 2054, the plate compactors 50, 1050, 2050 of the embodiments shown in FIGS. 3-10 improves maneuverability compared to the single-direction plate compactor 10 without requiring any additional components to achieve this additional performance.

Figure 11:
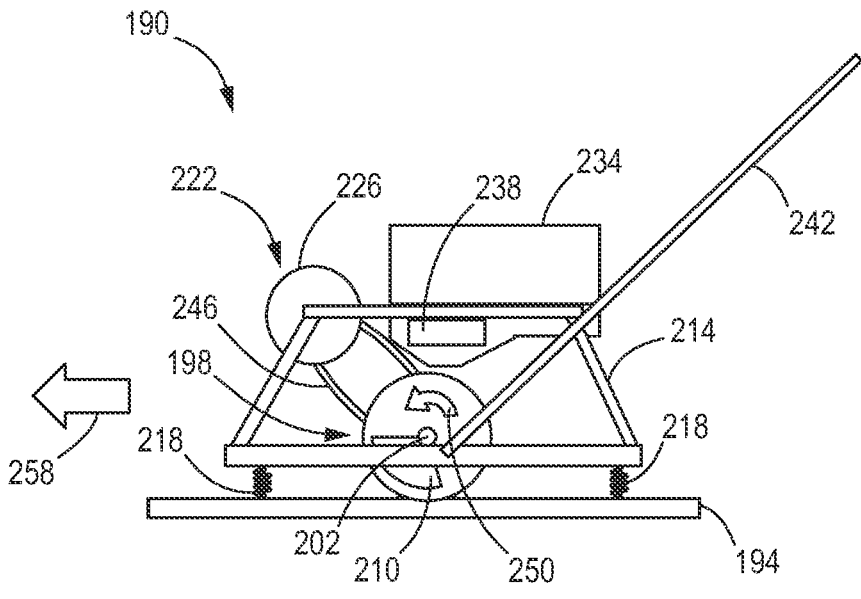
FIG. 11 is a schematic side view of a plate compactor according to another embodiment of the invention, traveling in a first linear direction.
Figure 12:
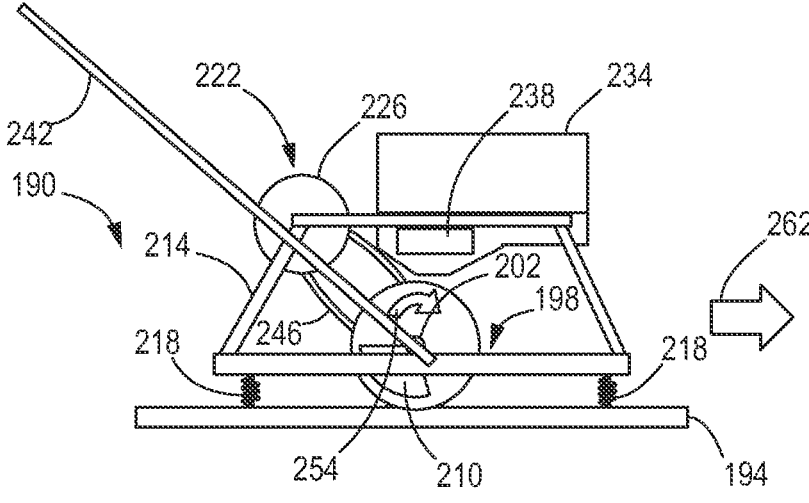
FIG. 12 is a schematic side view of the plate compactor of FIG. 11 traveling in a second linear direction.
Figure 11A:
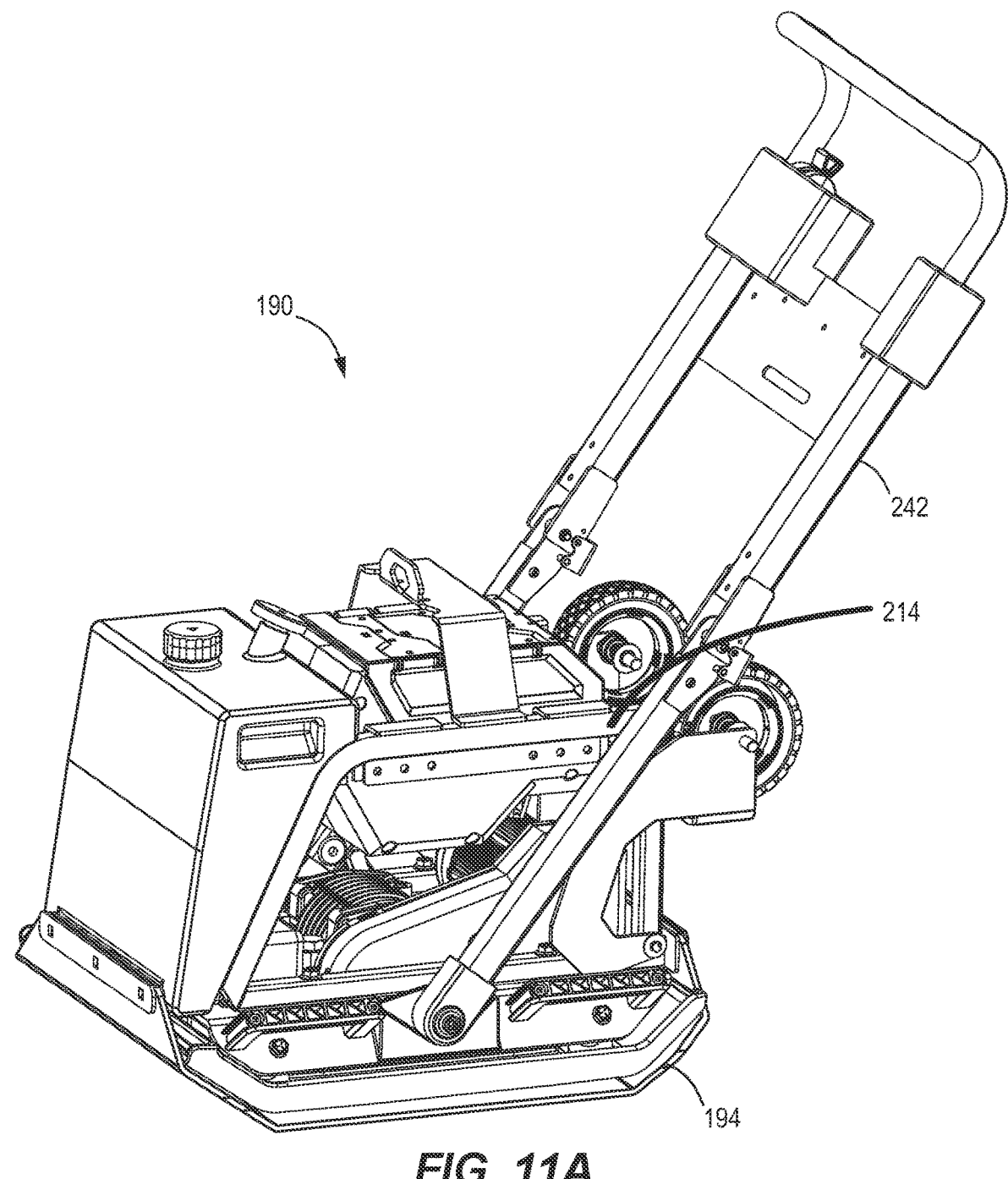
FIG. 11A is a perspective view of the plate compactor of FIG. 11.

FIGS. 11 and 12 illustrate another embodiment of a plate compactor 190 including a plate 194 and an exciter 198 mounted to the plate 194. Although the plate 194 is schematically illustrated as a single body, the plate 38 may comprise a combination of rigidly connected components that facilitate sliding the compactor 190 across a work surface to be compacted.

The exciter 198 includes an exciter shaft 202 having an exciter pulley and an eccentric mass 210. The plate compactor 190 also includes a frame 214 vibrationally isolated from the base plate 194 via vibration isolators or dampers, such as springs 218. A drive assembly 222 is mounted to the frame 214 and includes an electric motor 226, an optional gearbox, an output shaft of the motor or gearbox, and a drive pulley coupled for rotation with the output shaft. A battery pack 234 is also mounted to the frame 214 and is configured to provide power to the electric motor 226, as well as a set of control electronics 238 (shown schematically) that are configured to control operation of the electric motor 226.

A handle 242 for maneuvering the plate compactor 190 is moveably coupled to the frame 214 between a first position (FIG. 11) and a second position (FIG. 12) to permit a user to walk behind the plate compactor 190 while gripping the handle 242 regardless of the direction of movement of the plate compactor 190. The drive assembly 222 drives the exciter 198 via a belt 246 arranged between the drive pulley and exciter pulley. In other embodiments, the electric motor 226 is coupled directly to the plate 194 and the exciter 198, and directly drives the exciter 198, without any intermediate gearbox or belt. The drive assembly 222 is configured to rotate the exciter shaft 202 in a first rotational direction 250 (FIG. 11) and a second rotational direction 254 (FIG. 12) that is opposite the first rotational direction 250.

In operation, the movement direction of the plate compactor 190 is determined by the rotational direction of the exciter shaft 202. As shown in FIG. 11, while the handle 242 is gripped in the first position, the control electronics 238 are used to rotate the drive assembly 222 in a direction causing the exciter shaft 202 to rotate in the first rotational direction 250, thus causing the base plate 194 to vibrate and move the plate compactor 190 in a first linear direction 258 while compacting the ground beneath the base plate 194. After moving in the first linear direction for a period of time, it may be desirable to reverse direction of the plate compactor 190. Thus, the handle 242 is moved to the second position (FIG. 12) and gripped, and the control electronics 238 are used to rotate the drive assembly 222 in a direction causing the exciter shaft 202 to rotate in the second rotational direction 254. Rotation of the exciter shaft 202 in the second rotational direction 254 vibrates the base plate 194 and moves the plate compactor 190 in a second linear direction 262, which is opposite the first linear direction 258, while compacting the ground beneath the base plate 194.

Advantageously, the plate compactor 190 includes just a single exciter 198 to facilitate movement of the plate compactor 190 in both the first linear direction 258 and the second linear direction 262, thus making the plate compactor 190 a bidirectional plate compactor with just a single exciter 198. In contrast to the embodiment of FIGS. 11 and 12, certain prior art reversible plate compactors require two eccentric masses to enable bidirectional movement. For example, in certain prior art reversible plate compactors, one eccentric mass is located toward the front of the plate and another eccentric mass is located toward the rear of the plate.

FIGS. 13-18 illustrate another embodiment of a plate compactor 190' that is similar to the plate compactor 190 with like parts identified with like reference numerals plus an apostrophe, and with the following differences explained below. In the embodiment of FIGS. 13-18, the eccentric mass 210' is coupled to the exciter shaft 202' in a way that allows the eccentric mass 210' to translate along the exciter shaft 202' while it is rotating with the exciter shaft 202', in the same manner that the eccentric mass 62 can translate along the exciter shaft 66 of the plate compactor 50.

Figures 13, 14, 15, 16, 17, 18:
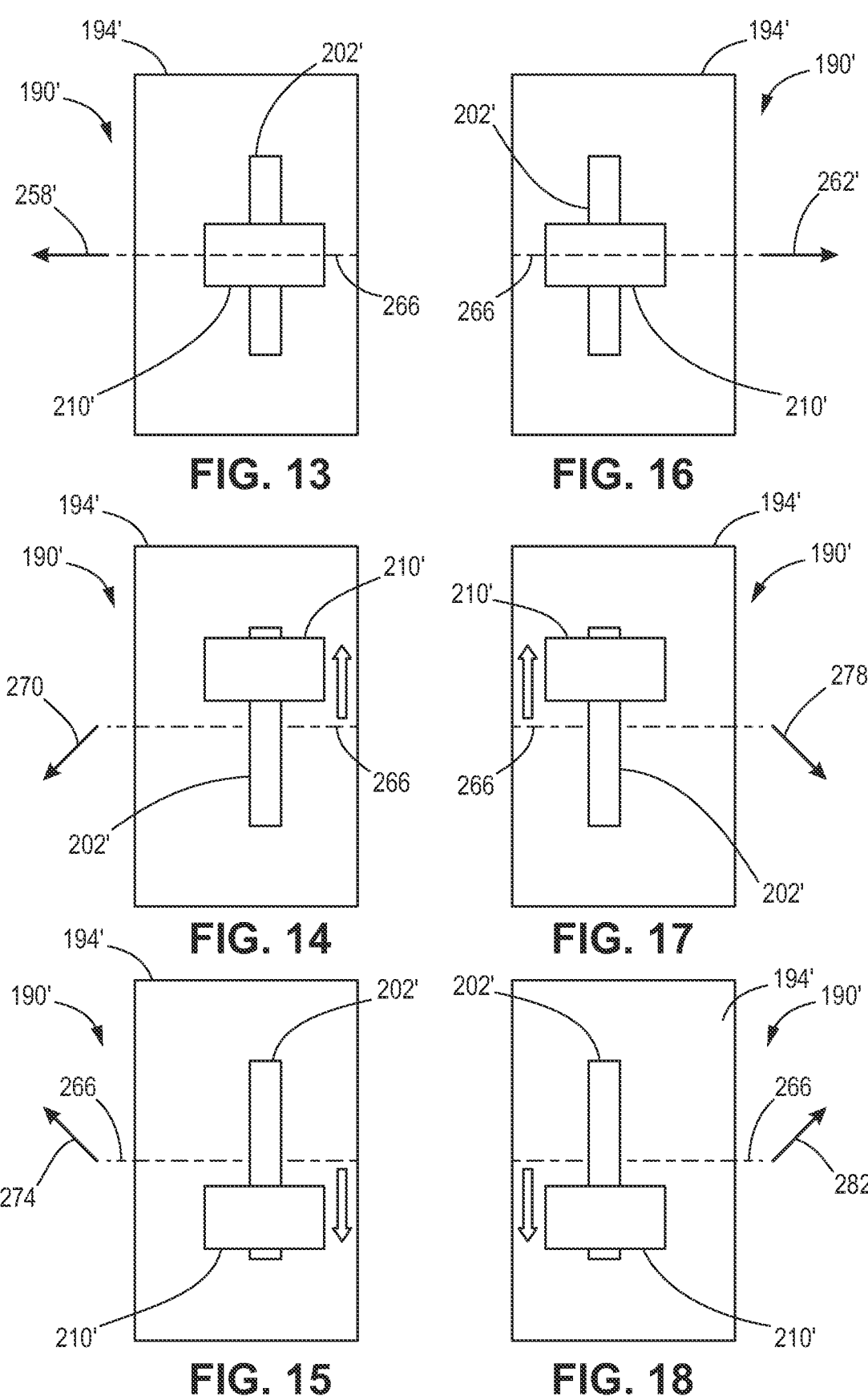
FIG. 13 is an enlarged schematic top view of a plate compactor, according to another embodiment of the invention, with an eccentric mass in a center position and an exciter shaft rotating in a first rotational direction.
FIG. 14 is an enlarged schematic top view of the plate compactor of FIG. 13, with the eccentric mass in a right-side position and the exciter shaft rotating in the first rotational direction.
FIG. 15 is an enlarged schematic top view of the plate compactor of FIG. 13, with the eccentric mass in a left-side position and the exciter shaft rotating in the first rotational direction.
FIG. 16 is an enlarged schematic top view of the plate compactor of FIG. 13, with the eccentric mass in a center position and the exciter shaft rotating in a second rotational direction.
FIG. 17 is an enlarged schematic top view of the plate compactor of FIG. 13, with the eccentric mass in a left-side position and the exciter shaft rotating in the second rotational direction.
FIG. 18 is an enlarged schematic top view of the plate compactor of FIG. 13, with the eccentric mass in a right-side position and the exciter shaft rotating in the second rotational direction.

Thus, when the eccentric mass 210' rotates in the first rotational direction with the exciter shaft 202' while the eccentric mass 210' is aligned with a central plane 266 that bisects the plate 194', the eccentric mass 210' causes the plate compactor 190' to move in the first linear direction 258' (i.e., a forward direction), as shown in FIG. 13. When the rotating eccentric mass 210' is moved to the right (from a frame of reference of standing to the right of FIG. 14) of the central plane 266 while rotating in the first rotational direction with the exciter shaft 202', the plate compactor 190' will move forward and to the left, as indicated by an arrow 270 shown in FIG. 14. When the rotating eccentric mass 210' is moved to the left (from a frame of reference of standing to the right of FIG. 15) of the central plane 266 while rotating in the first rotational direction with the exciter shaft 202', the plate compactor 190' will move forward and to the right, as indicated by an arrow 274 shown in FIG. 15.

Also, when the eccentric mass 210' rotates in the second rotational direction with the exciter shaft 202' while the eccentric mass 210' is aligned with the central plane 266, the eccentric mass 210' causes the plate compactor 190' to move in the second linear direction 262' (i.e., a reverse or backward direction), as shown in FIG. 16. When the rotating eccentric mass 210' is moved to the left (from a frame of reference of standing to the left of FIG. 17) of the central plane 266 while rotating in the second rotational direction with the exciter shaft 202', the plate compactor 190' will move backward and to the right, as indicated by an arrow 278 shown in FIG. 17. When the rotating eccentric mass 210' is moved to the right (from a frame of reference of standing to the left of FIG. 18) of the central plane 266 while rotating in the second rotational direction with the exciter shaft 202', the plate compactor 190' will move backward and to the left, as indicated by an arrow 282 shown in FIG. 18.

Thus, the plate compactor 190' of FIGS. 13-18 advantageously allows bidirectional travel with turning capabilities in both the forward and backward directions, with just a single exciter 198'.

Figure 19:
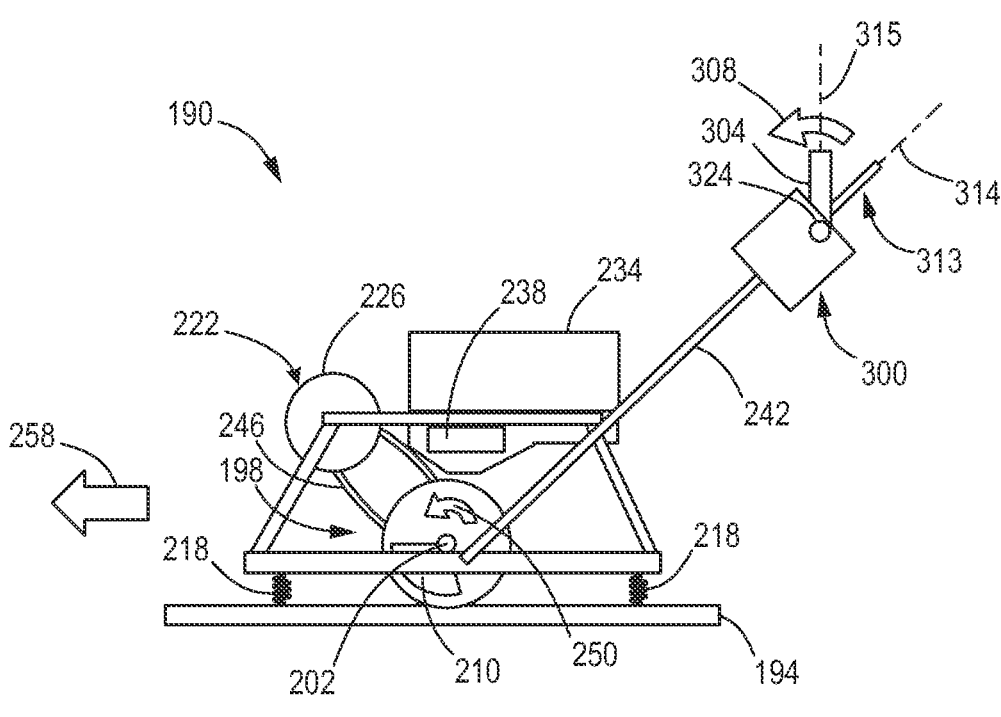
FIG. 19 is a schematic side view of a plate compactor according to another embodiment of the invention, traveling in a first linear direction.
Figure 20:
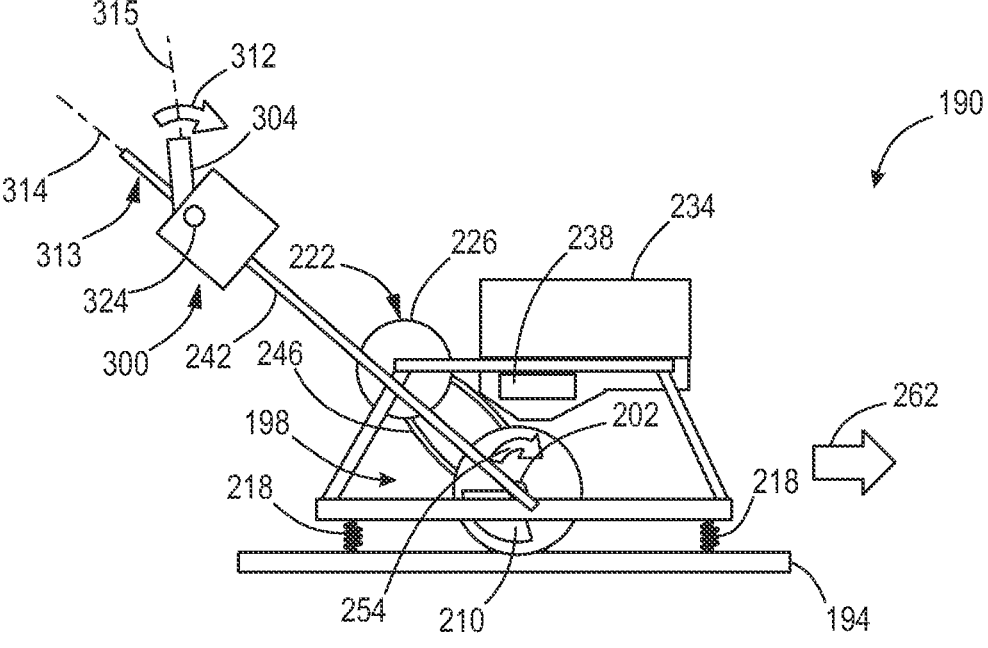
FIG. 20 is a schematic side view of the plate compactor of FIG. 11 traveling in a second linear direction.

FIGS. 19 and 20 illustrate the plate compactor 190 further including a user interface (UI) 300 for controlling operation of the plate compactor 190. The UI 300 is arranged to be intuitively actuated by an operator according to the operator's frame of reference as the handle 242 is moved between the first and second positions shown in FIGS. 19 and 20. FIG. 19 shows the handle 242 located in the first position and a lever 304 of the UI 300 pivoted in a first or forward direction 308. The forward direction 308 corresponds to rotation of the exciter shaft 202 in the first rotational direction 250, and to movement of the plate compactor 190 in the first linear direction 258. From the operator's frame of reference standing behind the handle 242, the forward direction 308 for the lever 304 is perceived forward, i.e., as movement of the lever 304 away from the operator and corresponding to movement of the plate compacter 190 away from the operator. FIG. 20 shows the handle 242 moved to the second position and the lever 304 of the UI 300 pivoted in a second or reverse direction 312. The reverse direction 312 corresponds to rotation of the exciter shaft 202 in the second rotational direction 254, and to movement of the plate compactor 190 in the second linear direction 262. With the handle 242 in the second position, the reverse direction 312 is still perceived as forward from the operator's frame of reference standing behind the handle 242, i.e., as movement of the lever 304 away from the operator and corresponding to movement of the plate compacter 190 away from the operator.

The handle 242 further includes a grip portion 313 located at a distal end of the handle 242 opposite the frame 214. When the handle 242 is in the first position (FIG. 19) and the plate compactor 190 moves in the first linear direction 258, the grip portion 313 follows behind the plate 194. That is, the grip portion 313 is behind the plate 194 when the handle 242 is in the first position and the compactor 190 moves in the first linear direction 258. When the handle 242 is in the second position (FIG. 20) and the plate compactor 190 moves in the second linear direction 262, the grip portion 313 likewise follows behind the plate 194. That is, the grip portion 313 is behind the plate 194 when the handle 242 is in the second position and the compactor 190 moves in the second linear direction 262.

With continued reference to FIGS. 19 and 20, the UI 300 controls movement of the compactor 190 between a resting state, a first movement state, and a second movement state. In the resting state the plate compactor 190 does not move in the first or second linear directions 258, 262. In the first movement state the compactor 190 moves in the first linear direction 258. In the second movement state the compactor 190 moves in the second linear direction 262.

The handle 242 defines a longitudinal handle axis 314. The lever 304 defines a longitudinal lever axis 315 and is pivotable about a pivot axis 324 extending perpendicular to the longitudinal handle axis 314. As the lever 304 pivots about the pivot axis 324, the UI 300 switches the state of the plate compactor 190 between the resting state, the first movement state, and the second movement state. In an off position 328 (FIG. 21) of the lever 304, the plate compactor 190 is in the resting state and the longitudinal lever axis 315 extends parallel to the longitudinal shaft axis 314. When the lever 304 is pivoted in the forward direction 308 (FIG. 19) from the off position 328, the UI 300 switches the plate compactor 190 to the first movement state. When the lever 304 is pivoted in the reverse direction 312 (FIG. 20) from the off position 328, the UI 300 switches the plate compactor 190 to the second movement state.

Figure 21:
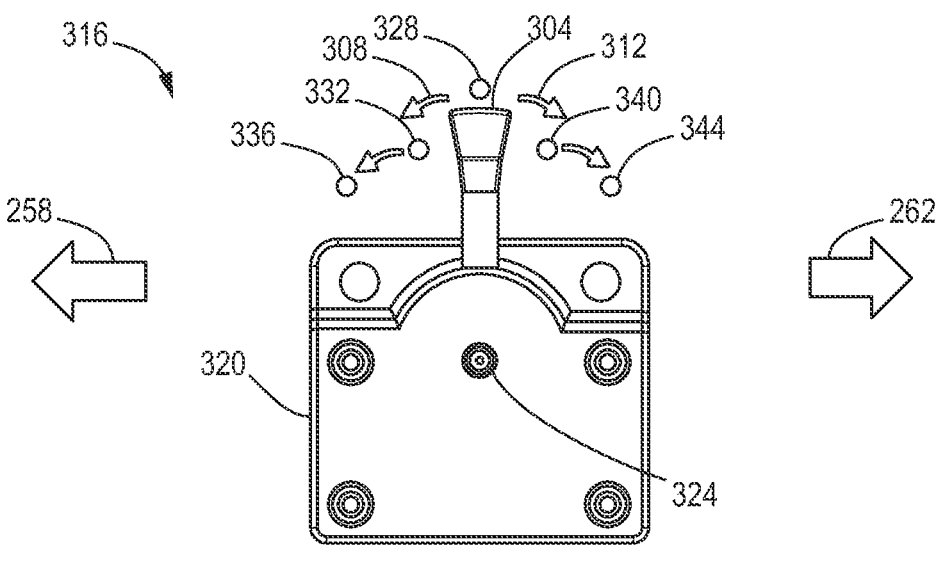
FIG. 21 is a side view of a control unit assembly of the plate compactor of FIG. 19.

FIGS. 21-26 illustrate the UI 300 embodied as a control unit assembly 316 that includes the lever 304 pivotable to control activation of the plate compactor 190, movement of the plate compactor 190 in the first and second linear directions 258, 262, and movement speed. With reference to FIG. 21, the lever 304 is pivotable relative to a housing 320 of the control unit assembly 316 about a pivot axis 324. The lever 304 is shown at the off position 328 in FIG. 21 at which the motor 226 is deactivated and the exciter shaft 202 does not rotate. The lever 304 can pivot in the first or forward direction 308 from the off position 328 to activate the motor 226. Pivoting the lever 304 in the forward direction 308 from the off position 328 causes the exciter shaft 202 to rotate in the first rotational direction 250 such that the plate compacter 190 moves in the first linear direction 258. The lever 304 can also pivot in the second or reverse direction 312 from the off position 328 to activate the motor 226. Pivoting the lever 304 in the reverse direction 312 from the off position 328 causes the exciter shaft 202 to rotate in the second rotational direction 254 such that the plate compacter 190 moves in the second linear direction 262. In some embodiments, switching the lever 304 between the forward and reverse directions 308, 312 causes the rotation direction of the motor 226 itself to reverse.

FIG. 21 further illustrates a plurality of forward and reverse positions at which the lever 304 can be set to cause the plate compacter 190 to move at differing speeds in the first linear direction 258 and the second linear direction 262. Specifically, the lever 304 is pivotable to a first forward position, or forward slow position 332, that results in movement of the plate compacter 190 in the first linear direction 258 at a first speed. The lever 304 is further pivotable to a second forward position, or forward fast position 336, that results in movement of the plate compactor 190 in the first linear direction 258 at a second speed greater than the first speed. Similarly, the lever 304 is pivotable to a first reverse position, or reverse slow position 340, that results in movement of the plate compactor 190 in the second linear direction 262 at a third speed. The lever 304 is further pivotable to a second reverse position, or reverse fast position 344, that results in movement of the plate compactor 190 in the second linear direction 262 at a fourth speed greater than the third speed. Although only two forward positions 332, 336 and two reverse positions 340, 344 are described, the lever 304 can be capable of additional forward and reverse positions to provide for further adjustment of the speed at which the plate compactor 190 operates. In other embodiments, the lever 304 can be capable of smooth adjustment in the forward and reverse directions 308, 312 without any discrete forward and reverse positions. In further embodiments, the lever 304 can be capable of only the off position 328, the forward fast position 336, and the reverse fast position 344, with the forward slow position 332 and the reverse slow position 340 being omitted.

Figure 22:
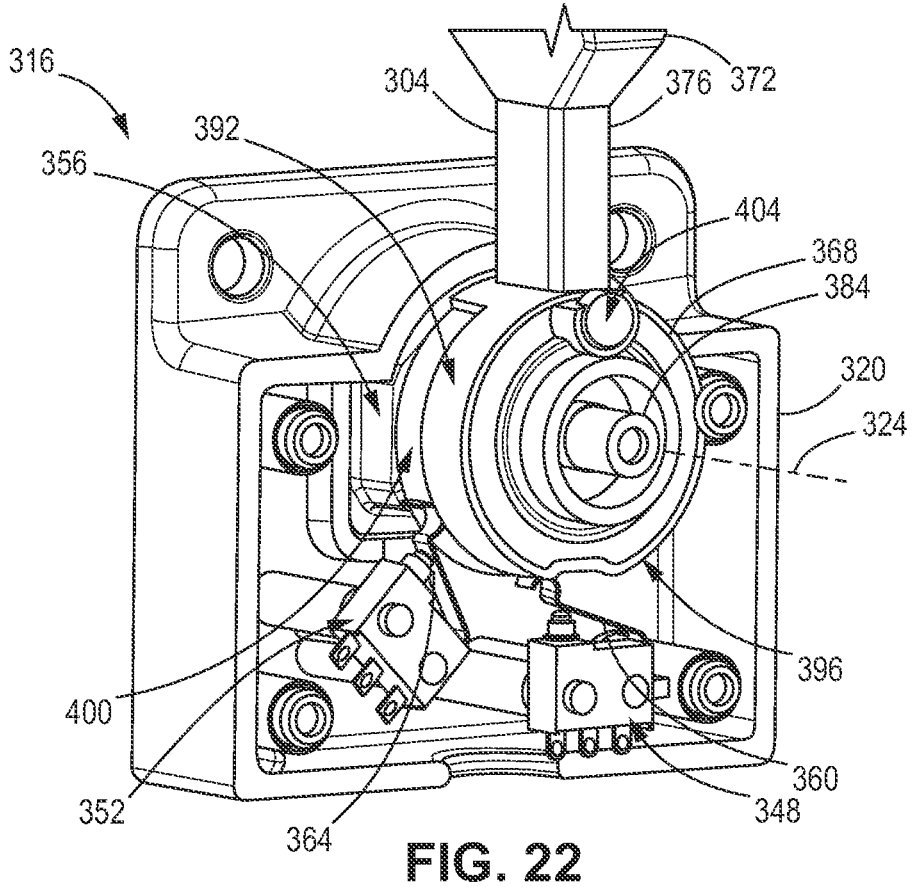
FIG. 22 is a perspective view of the control unit assembly of FIG. 21 with portions removed.

With reference to FIG. 22, the control unit assembly 316 also includes a first or on/off microswitch 348, a second or forward/reverse microswitch 352, and a potentiometer 356. The on/off microswitch 348 is operable to control activation of the motor 226. The on/off microswitch 348 includes a first arm 360 movable between an extended position (FIG. 22) at which the on/off microswitch 348 is open and the motor 226 is deactivated, and a retracted position (FIGS. 25 and 26) at which the on/off microswitch 348 is closed and the motor 226 is permitted to activate. The forward/reverse microswitch 352 is operable to control the rotation direction of the exciter shaft 202, causing the plate compactor 190 to change movement directions between the first linear direction 258 and the second linear direction 262. The forward/reverse microswitch 352 includes a second arm 364 movable between an extended position (FIG. 25) at which the forward/reverse microswitch 352 is open and the exciter shaft 202 rotates in the first rotational direction 250 (FIG. 19), and a retracted position (FIG. 26) at which the forward/reverse microswitch 352 is closed and the exciter shaft 202 rotates in the second rotational direction 250 (FIG. 20). The potentiometer 356 is operable to control the speed at which the exciter shaft 202 rotates, which corresponds to the speed at which the plate compactor 190 moves in the first linear direction 258 or the second linear direction 262. In some embodiments, the potentiometer 356 generates a speed signal that controls the rotation speed of the motor 226 itself.

Figure 23:
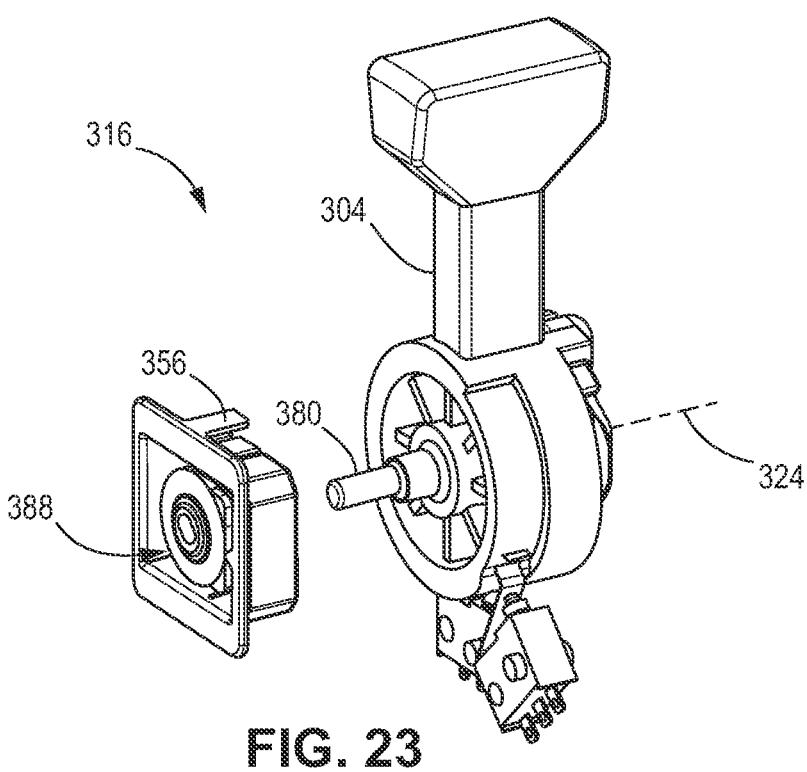
FIG. 23 is a partially exploded perspective view of the control unit assembly of FIG. 21 with portions removed.

With reference to FIGS. 22 and 23, the lever 304 includes a generally cylindrical hub portion 368 supported within the housing 320, a handle portion 372, and an elongated connecting portion 376 extending between the hub and handle portions 368, 372. First and second shaft portions 380, 384 extend laterally outward from the hub portion 368 and define the pivot axis 324 about which the lever 304 rotates relative to the housing 320. The first shaft portion 380 is supported within a keyed aperture 388 defined by the potentiometer 356. As the lever 304 pivots about the pivot axis 324, the first shaft portion 380 actuates the potentiometer 356 to adjust the rotational speed of the exciter shaft 202.

The hub portion 368 defines a cylindrical outer surface 392, a first groove or first cam profile 396 formed in the outer surface 392, and a second groove or second cam profile 400 formed in the outer surface 392. The first cam profile 396 is positioned 180 degrees opposite from the connecting portion 376 and interfaces with the first arm 360 of the on/off microswitch 348 when the lever 304 is located at the off position 328 as shown in FIG. 22. The second cam profile 400 interfaces with the second arm 364 of the forward/reverse microswitch 352 when the lever 304 rotates between the off position 328, the forward slow position 332, and the forward fast position 336.

Figure 24:
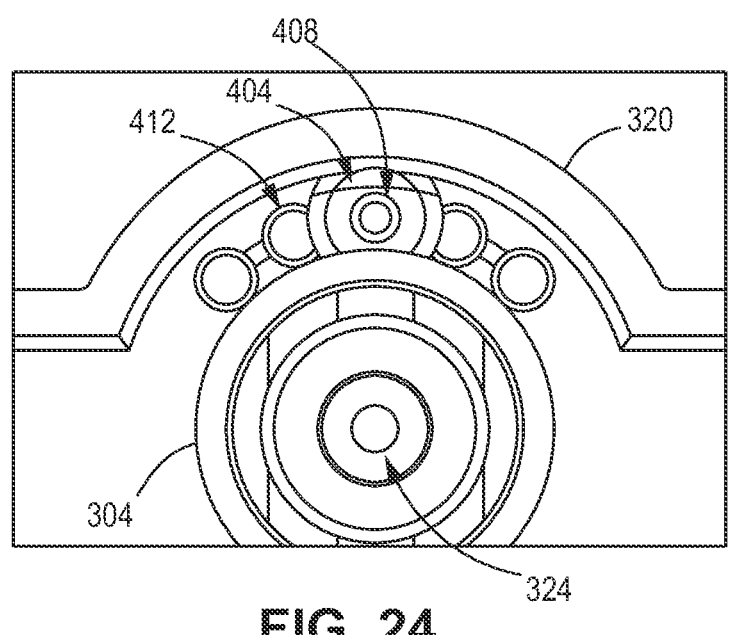
FIG. 24 is a partial cross-sectional view of the control unit assembly of FIG. 21.

With reference to FIGS. 22 and 24, the lever 304 supports a detent 404 that faces a portion of the housing 320, and a spring 408 that biases the detent 404 toward the housing 320. The detent 404 is engageable with dimples or recesses 412 defined in the housing 320 and provided at locations corresponding to the off position 328, the forward slow position 332, the forward fast position 336, the reverse slow position 340, and the reverse fast position 344. When the lever 304 is pivoted to one of the aforementioned positions, the detent 404 engages the corresponding recess 412 to releasable secure the lever 304 in the selected position.

Figures 25, 26:
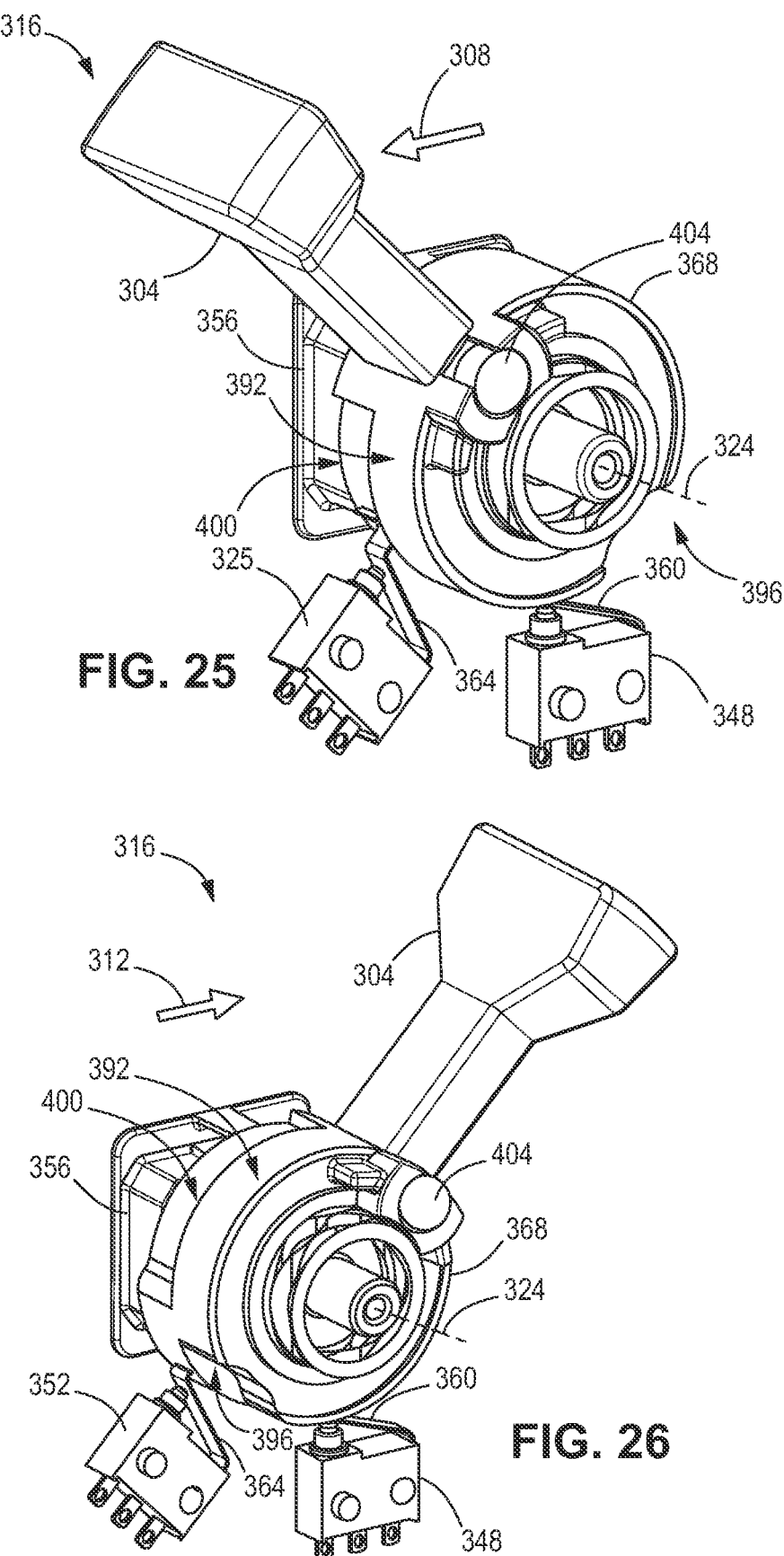
FIG. 25 is a perspective view of the control unit assembly of FIG. 21 with portions removed, showing a lever actuated in a first direction.
FIG. 26 is a perspective view of the control unit assembly of FIG. 21 with portions removed, showing the lever actuated in a second direction.

With reference to FIGS. 22, 25, and 26, operation of the control unit assembly 316 will now be described. FIG. 22 shows the control unit assembly 316 with the lever 304 located in the off position 328. In the off position 328, the first arm 360 of the on/off microswitch 348 is in the extended position and extends into the first cam profile 396. As such, the on/off microswitch 348 is open and the motor 226 is deactivated. The second arm 364 of the forward/reverse microswitch 352 is likewise in the extended position and resides within the second cam profile 400.

FIG. 25 shows the lever 304 pivoted in the forward direction 308 from the off position 328 toward the forward fast position 336. The first cam profile 396 is rotated away from the first arm 360 so that the first arm 360 engages the cylindrical outer surface 392 of the hub portion 368, causing the first arm 360 to move to the retracted position. With the first arm 360 in the retracted position, the on/off microswitch 348 closes and the motor 226 is permitted to activate. The second arm 364 still resides within the second cam profile 400 and the forward/reverse microswitch 352 remains open, corresponding to rotation of the exciter shaft 202 in the first rotational direction 250. The potentiometer 356 is actuated by the first shaft portion 380 to increase the rotational speed of the exciter shaft 202 as the lever 304 progresses toward the forward fast position.

FIG. 26 shows the lever 304 pivoted in the reverse direction 312 from the off position 328 toward the reverse fast position 344. The first cam profile 396 is rotated away from the first arm 360 so that the first arm 360 engages the cylindrical outer surface 392 of the hub portion 368, causing the first arm 360 to move to the retracted position. With the first arm 360 in the retracted position, the on/off microswitch 348 closes and the motor 226 is permitted to activate. The second cam profile 400 is also rotated away from the second arm 364 so that the second arm 364 engages the cylindrical outer surface of the hub portion 368 and is moved to the retracted position. With the second arm 364 in the retracted position, the forward/reverse microswitch 352 closes, corresponding to rotation of the exciter shaft 202 in the second rotational direction 254. The potentiometer 356 is actuated by the first shaft portion 380 to increase the rotational speed of the exciter shaft 202 as the lever 304 progresses toward the reverse fast position.

Although the invention has been described in detail with reference to certain preferred embodiments, variations and modifications exist within the scope and spirit of one or more independent aspects of the invention as described.

Various features of the invention are set forth in the following claims.

What is claimed is:

1. A compactor comprising:
a plate;
a shaft rotatably supported on the plate;
an electric motor configured to cause rotation of the shaft;
an eccentric mass arranged to rotate on the shaft, causing the plate to vibrate in response to rotation of the eccentric mass; and
a frame configured to support a handle,
wherein in response to the shaft rotating in a first rotational direction, the compactor is moved in a first linear direction,
wherein in response to the shaft rotating in a second rotational direction that is opposite the first rotational direction, the compactor is moved in a second linear direction that is opposite the first linear direction,
wherein the handle is moveably coupled to a middle of the frame between a first position corresponding to the first linear direction at which the handle follows behind the plate when the compactor moves in the first linear direction and a second position corresponding to the second linear direction at which the handle follows behind the plate when the compactor moves in the second linear direction, and
wherein the eccentric mass is configured to translate along the shaft.

2. The compactor of claim 1, wherein the frame is vibrationally isolated from the plate.

3. The compactor of claim 2, further comprising a battery coupled to the frame, the battery configured to provide power to the electric motor.

4. The compactor of claim 2, wherein the electric motor is configured to be supported by the frame.

5. The compactor of claim 4, further comprising a transmission coupling the electric motor to the shaft.

6. A compactor comprising:
a frame;
a plate coupled to the frame;
a shaft rotatably supported upon the plate;
an electric motor configured to rotate the shaft;

an eccentric mass arranged to rotate on the shaft and configured to vibrate the plate relative to the frame in response to rotation of the eccentric mass, and further configured to effect movement of the plate compactor in a first linear direction and in a second linear direction opposite the first linear direction;
an elongated handle moveably coupled to a middle of the frame and defining a longitudinal handle axis, the elongated handle having a grip portion and being movable between a first position at which the grip portion follows behind the plate when the compactor moves in the first linear direction, and a second position at which the grip portion follows behind the plate when the compactor moves in the second linear direction; and
a user interface coupled to the elongated handle and configured to control movement of the compactor between a resting state in which the compactor does not move, a first movement state in which the compactor moves in the first linear direction, and a second movement state in which the compactor moves in the second linear direction, the user interface including a lever defining a longitudinal lever axis and being pivotable about a pivot axis perpendicular to the longitudinal handle axis;
wherein at an off position of the lever, the plate compactor is in a resting state and the longitudinal lever axis is parallel to the longitudinal handle axis,
wherein in response to the shaft rotating in a first rotational direction, the compactor is moved in the first linear direction,
wherein in response to the shaft rotating in a second rotational direction that is opposite the first rotational direction, the compactor is moved in the second linear direction, and
wherein the eccentric mass is configured to translate along the shaft.

7. The compactor of claim 6, wherein the frame is vibrationally isolated from the plate.

8. The compactor of claim 6, further comprising a battery coupled to the frame, the battery configured to provide power to the electric motor.

9. The compactor of claim 6, further comprising a transmission coupling the electric motor to the shaft.

10. A compactor comprising:
a plate;
a shaft rotatably supported on the plate;
an electric motor configured to cause rotation of the shaft; and
an eccentric mass arranged to rotate on the shaft, causing the plate to vibrate in response to rotation of the eccentric mass, wherein the eccentric mass is configured to translate along the shaft,
wherein in response to the shaft rotating in a first rotational direction, the compactor is moved in a linear direction, and
wherein in response to the eccentric mass translating along the shaft, the compactor is turned relative to the linear direction.

* * * * *